United States Patent
Berry

[15] 3,685,851
[45] Aug. 22, 1972

[54] MOBILE CABINET

[72] Inventor: Hammond A. Berry, Spring Lake, Mich.

[73] Assignee: E. H. Sheldon and Company, Muskegon, Mich.

[22] Filed: April 27, 1970

[21] Appl. No.: 31,886

[52] U.S. Cl. ..........280/43.22, 280/43.17, 280/43.24
[51] Int. Cl. ...............................................B62d 33/08
[58] Field of Search.....280/8, 43, 43.1, 43.11, 43.17, 280/43.22, 43.24, 47, 47.16, 47.2, 47.21, 150, 150 A; 254/1

[56] References Cited

UNITED STATES PATENTS

| | | | |
|---|---|---|---|
| 1,343,268 | 6/1920 | Kopplin | 280/43.17 |
| 393,076 | 11/1888 | Novotny | 280/9 |
| 3,198,539 | 8/1965 | McMullen | 280/43.17 |
| 1,907,005 | 5/1933 | Risser | 280/43.17 X |
| 2,150,441 | 3/1939 | Harris | 280/43.1 |
| 1,857,653 | 5/1932 | Meyercord et al. | 280/43.24 X |
| 1,661,959 | 3/1928 | Reek | 280/43.17 X |
| 1,715,865 | 6/1929 | Rosenfeld | 280/43.24 X |
| 3,263,765 | 8/1966 | Just et al. | 280/43.24 X |

Primary Examiner—Benjamin Hersh
Assistant Examiner—Winston H. Douglas
Attorney—Dawson, Tilton, Fallon & Lungmus

[57] ABSTRACT

A cabinet or support structure is equipped with a pair of large wheels mounted on wheel hubs that are eccentrically supported upon an axle, the axle being rotatable to raise the wheel hubs and thereby the wheels so that the bottom of the cabinet can seat on the floor or floor carpet, and when the axle is rotated to lower the hubs, the cabinet can then be moved on the large wheels together with edge-supported casters. Means are provided for rotating the axle and locking it in adjusted positions.

4 Claims, 14 Drawing Figures

PATENTED AUG 22 1972

INVENTOR
Hammond A. Berry

BY Dawson, Tilton, Fallon
and Lungmus
ATTORNEYS

INVENTOR
Hammond A. Berry
BY Dawson, Tilton, Fallon and Lungmus
ATTORNEYS

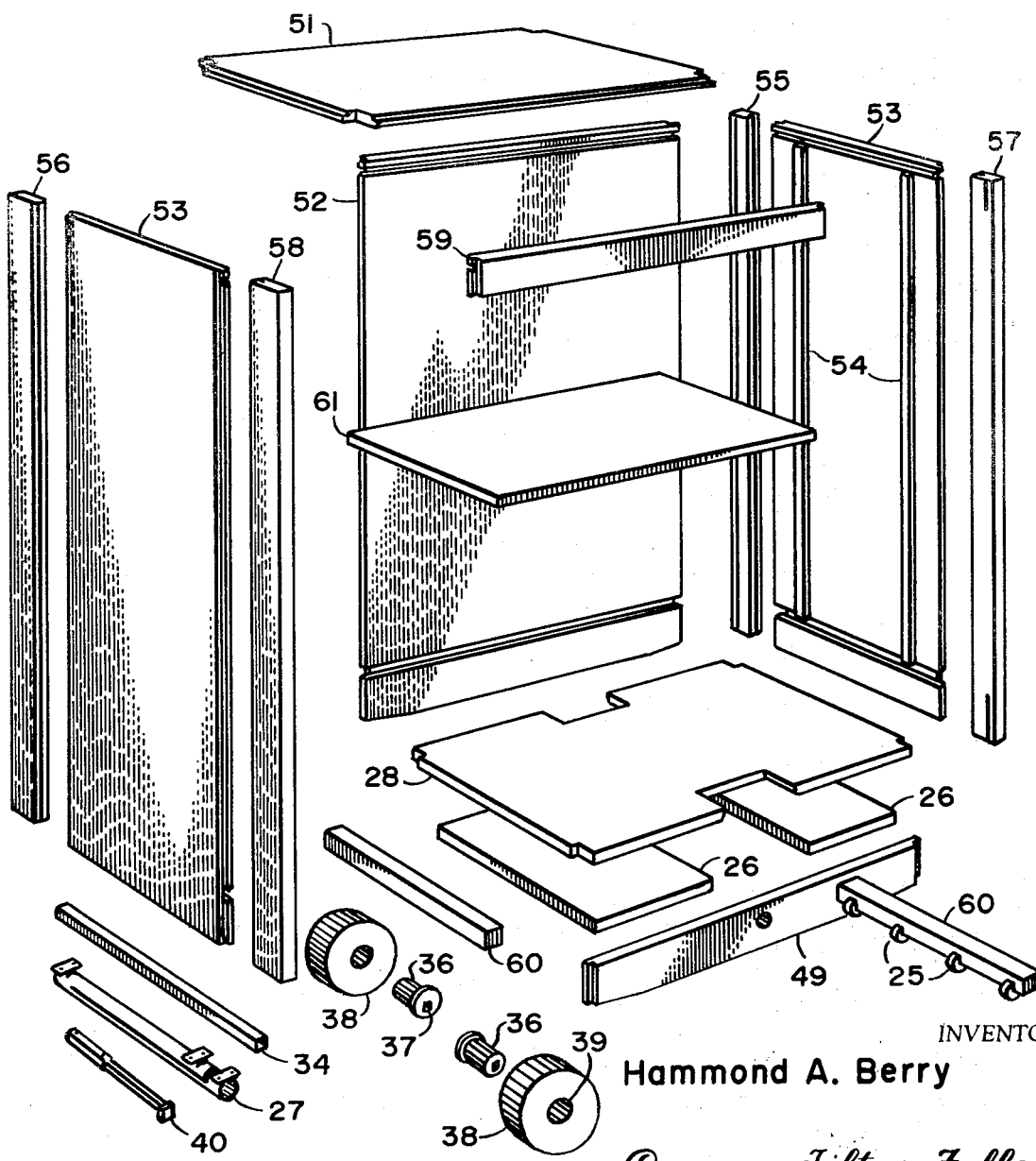

MOBILE CABINET

BACKGROUND AND SUMMARY

It is desired to have a cabinet or similar structure which will seat flat on the floor or floor carpet with great stability while it is being used, while also providing means for rendering the cabinet mobile and preventing it from digging deeply into carpets or other floor mountings. Carpeted areas present a problem for the moving and locating of cabinets in that wheels or casters on the cabinets tend to dig holes in carpets, leaving unsightly scars, and when it is desired to move the cabinet on wheels the holes present steep inclines that the wheels or casters have to climb out of before normal rolling movement is realized.

I have discovered that the problem can be overcome by employing large wheels mounted on hubs that are eccentrically supported upon an axle so that with the axle in one position, the cabinet will rest with great stability on its base on the carpet, thus presenting a broad area of contact, while when the axle is rotated to lower the wheel hubs or mountings, the cabinet will then be carried by the wheels or movement over the carpet, and this movement is aided by anti-friction rollers or glides at the edges of the carpet, such edges being preferably cut away to render the rollers effective only when the cabinet is tilted by the lowering of the wheels.

DRAWINGS

In the accompanying drawings, FIG. 1 is a broken side view in elevation of the cabinet at rest on the floor or carpet and with the wheels above the floor; FIG. 2, a view similar to FIG. 1 but showing the cabinet in a raised and tilted position for movement to another location; FIG. 3, a broken enlarged view of the lower portion of the cabinet showing the wheels in raised position and with a crank arm pulled out and turned sideways as the first step in lowering the large wheels for movement of the cabinet; FIG. 4, a view similar to FIG. 3 but showing the crank arm turned 90° for lowering the wheels and thus raising the cabinet half of the desired distance; FIG. 5, a view similar to FIG. 4 but showing the crank arm turned the full 180° so that the cabinet is raised for movement across the carpet, in dotted line the crank arm being shown pushed into the cabinet for locking the crank in this position during the moving operation; FIG. 6, a broken perspective view of the large wheels and axle and the crank arm employed for rotating the axle; FIG. 7, a detail sectional view of the lower portion of the cabinet taken at line 7—7 of FIG. 3 but showing the crank arm retracted into the axle as shown in dotted lines in FIG. 3; FIG. 8, a similar sectional view taken at line 8—8 of FIG. 4 with the crank arm in vertical position, thus raising the cabinet halfway up; FIG. 9, a sectional detail view, the section being taken at line 9—9 of FIG. 5 and showing the cabinet raised all of the way on fully lowered wheels, and with the crank arm retracted into the axle as shown in dotted lines in FIG. 5; FIGS. 10 and 11, the sectional view and side view respectively of the square axle showing that the slot is on only one side of the tube; FIGS. 12 and 13, the sectional and side views of the axle housing showing that the slot is U-shaped and that it is longer on one side than the other; and FIG. 14, an exploded perspective view showing all of the parts of the cabinet except the doors and some attachment parts.

DETAILED DESCRIPTION

Figures 1, 2:
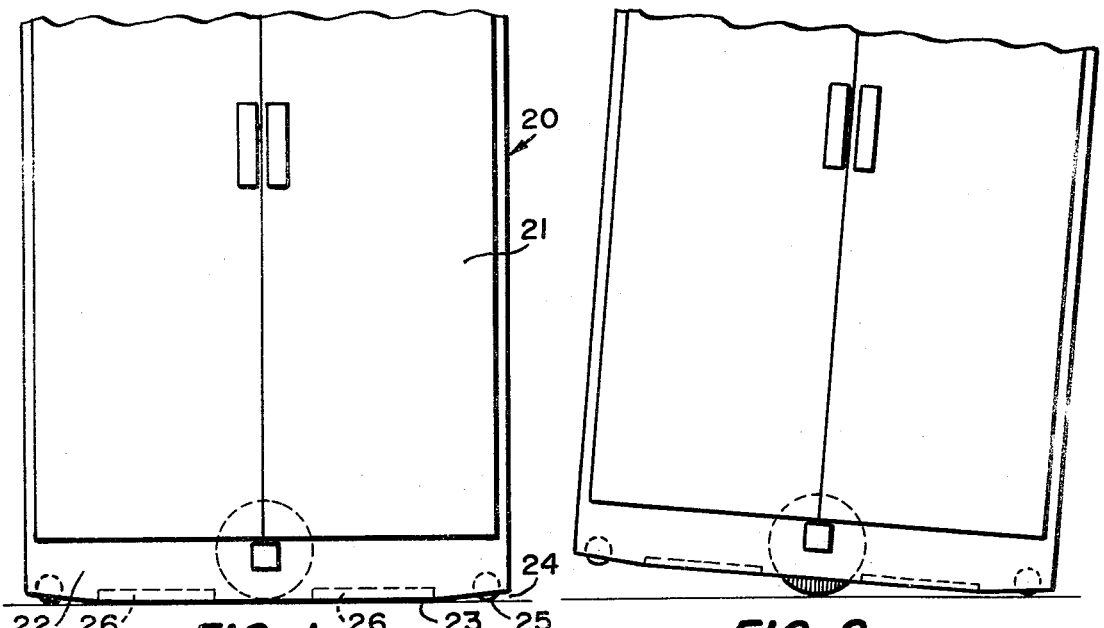
Figure 3:
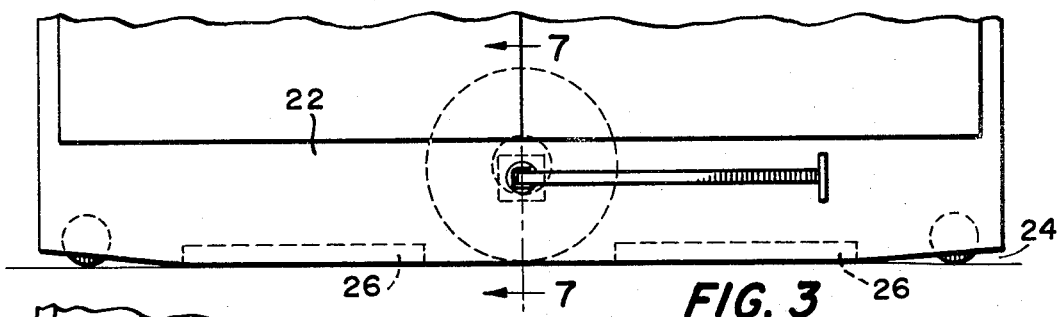
Figure 5:
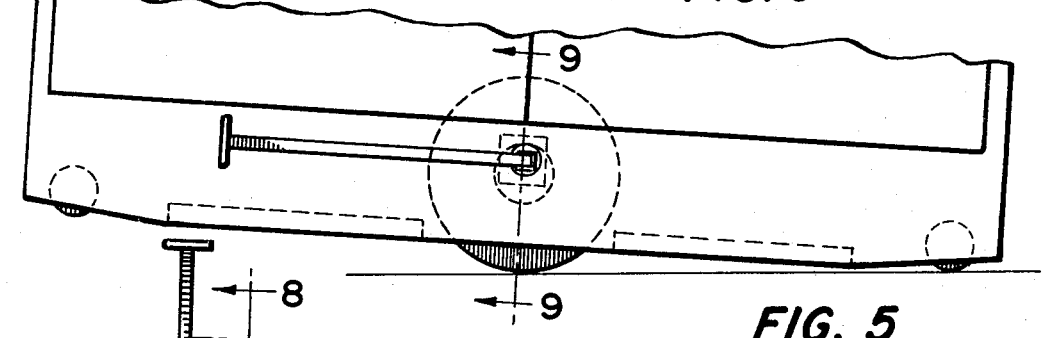
Figure 4:
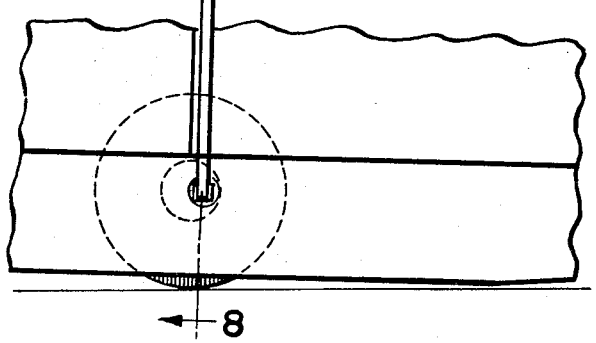

The cabinet described herein is illustrative of various types of articles or support structures which may be used with the present invention and the term "cabinet" is therefore employed in the broad sense of a support type of structure.

The cabinet is one with a broad base adapted to seat upon a carpeted floor without damaging the floor and presenting a highly stable structure for use as a fixed cabinet. The mobile means which are disclosed are out of the way and preferably concealed and are utilized only when it is desired to move the cabinet to another location. For moving the cabinet to another location, the mechanism disclosed provides rotatable wheel hubs or wheel supports mounted eccentrically upon an axle, the axle being rotatable to lift the wheel hubs so that the wheels rest above the floor, or to lower the wheel hubs so that the wheels engage the floor and raise the cabinet. For rotating the axle, I provide a crank which is normally concealed within the axle but which may be withdrawn to an angular position so as to rotate the axle. When the axle has been rotated either to raised or lowered position, the crank may be folded and moved within the axle for concealing it while also providing locking means for holding the elevated or lowered wheel in its adjusted position.

By providing the cabinet at its forward or rear edges or at both edges with casters and preferably cutting away the corner edges, it is found that when the cabinet is tilted upon the large center wheels the cabinet structure is easily carried by the set of casters at one edge together with the large wheels. At the same time, when the large wheel are raised, not only the large wheels but also the casters are located above the floor or carpet and do not prevent the broad base of the cabinet from effectively serving as a stable base.

Referring to the drawings, a cabinet 20 is in general appearance a typical two-door 21 type, with a full skirt 22 extending to the floor 23 in front and rear, the skirt being cut away slightly at the corners and ends 24 to allow the small casters 25 to protrude slightly.

The cabinet has two broad bottom panels 26 on which it sets when being used, and this prevents the cabinet from sinking into the pile of the rug or carpet and making unsightly holes.

Figure 6:
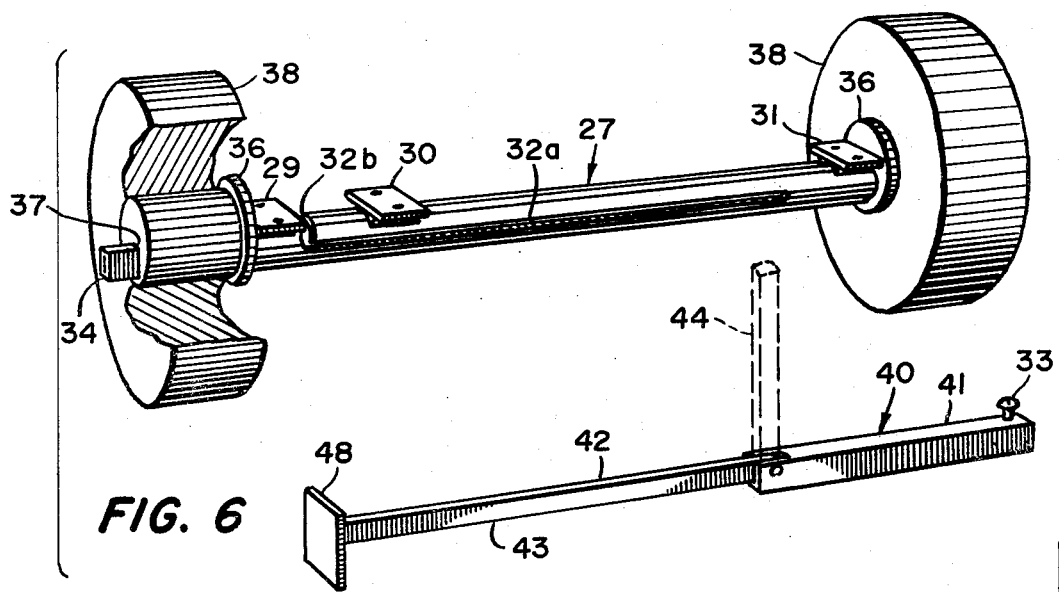
Figure 7:
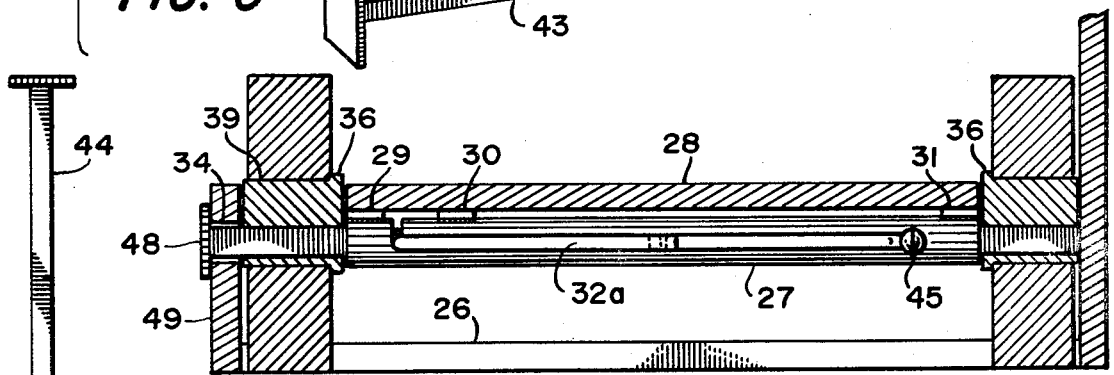

As can be best seen in FIGS. 6 and 7, the cabinet lifting mechanism consists of a cylindrical axle housing 27 which is attached to the cabinet bottom 28 by three plates 29, 30 and 31. The axle housing 27 has a long U-shaped slot 32 in which the crank screw 33 travels when the cabinet is being raised or lowered. The axle 34 is square, with a screw slot 35 on one side only.

On the axle 34 fits two wheel hubs or bearings 36 with a square hole 37 being eccentrically located within the hubs, and on the hubs rotate the large wheels 38 having concentric round holes 39 receiving the hubs.

Figure 8:
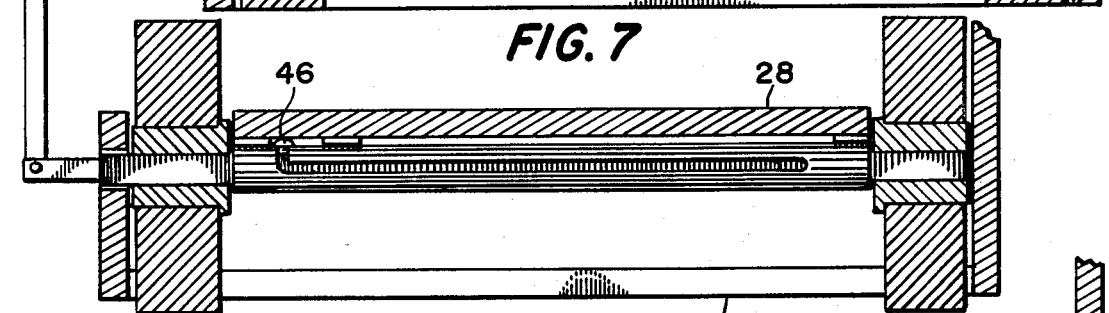

The crank 40 consists of a square tubular body 41 which slides inside the square axle 34 and an arm 42 which can assume two positions, (1) parallel to the body as at 43 when it is in the axle, or (2) perpendicular to the body as at 44 for raising and lowering the cabinet. Compare the relationship of the vertically-turned arm 44 and the screw 33 in FIG. 6. As the arm is rotated, when pulled out as shown in FIG. 8, it transfers the screw 33 from grove 32a as at 45 through the end of the U-slot 32b as at 46 and into the slot 32c as at 47 (FIG. 9).

Figure 9:
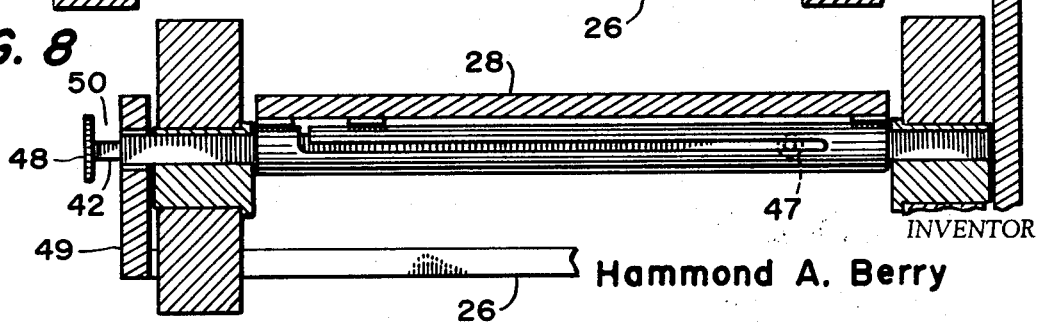

There is an end cap 48 on the crank arm 42 which fits snugly against the lower cabinet front piece 49 when the cabinet is resting on the floor, as in FIG. 7, when the screw 33 is at the end of the slot 32a, but when the cabinet is raised, as shown in FIG. 9, the end cap 48 is spaced away from the cabinet front 49, as indicated at 50, because slot 32c is not as long as slot 32a (FIG. 13). As a result, the protruding end cap 48 can be grasped easily and pulled out when the cabinet is to be lowered again. However, when the cabinet is being used for storage, the end cap fits snugly against the cabinet front, as shown in FIG. 7, so as to be out of the way and to hide the end of the square axle 34.

The cabinet itself may be of any suitable construction and the cabinet structure shown in the drawing is merely for illustration. In the drawing, the cabinet consists of a top panel 51, back panel 52, end panels 53 with adjustable shelving strips 54, rear corner pieces 55 and 56, front corner pieces 57 and 58, bottom piece 28, a lower broad bottom panel or base 26 spaced from bottom piece 28, upper front piece 59, lower front piece 49, and two multiple caster holders 60 each with four casters 25. The shelves are indicated by numeral 61 and there are two doors 21 not shown in FIG. 14. In the caster holder 60 at the lefthand side of FIG. 14, the casters do not appear because they are hidden from view. In the structure, it will be noted that there are two bottom panels which are spaced apart, the lower panel 26 serving as a broad base for the cabinet.

Basically the structure is successful because when the center wheels 38 are elevated, the angle of the cabinet is such that the bevel on the outer ends of the bottom parallels the floor line and exposes the bottom portion of the four small wheels or casters. When the cabinet is not being moved, it rests flat on the bottom 26 and the little wheels or casters 25 ride at about the floor line so that there is no pressure on them.

The cabinet side walls provide a full skirt extending to the bottom of the cabinet and about the wheels so that there is no dirt accumulation under the cabinet to be removed when the cabinet is moved.

While in the foregoing specification I have set out a specific structure in considerable detail for the purpose of illustrating an embodiment of the invention, it will be understood that such details may be varied widely by those skilled in the art without departing from the spirit of my invention.

I claim:

1. In a cabinet structure adapted for stationary and mobile use on a floor, a cabinet frame having sides and a base adapted to a rest on the floor, a tubular axle housing secured to said frame and defining a continuous slot including first and second elongated axial sections and a circumferential section communicating one end of each of said elongated axial sections, an axle rotatably mounted in said housing and defining an elongated axial slot, wheel hubs eccentrically mounted on said axle for rotation therewith whereby rotation of said axle selectively raises and lowers said wheel hubs, wheels rotatably mounted on said hubs, and a crank telescopically received in said axle and including a radial pin extending through the axial slot of said axle and said slot of said axle housing for selectively rotating said axle to bring said wheels to positions above and below said cabinet base.

2. The structure of claim 1 wherein said axle is a tube having a square cross section and said telescopically received crank also has a square cross section thereby to prevent relative rotational movement between said crank and said axle.

3. The structure of claim 2 wherein said first elongated axial section of said slot in said axle housing is longer than said second elongated section therein whereby when said pin of said crank is traveling in said first axial section, said crank may be inserted further into said axle and said axle housing and when said pin is traveling in said second axial section of said slot, the insertion of said crank is limited for easier access to said crank.

4. The structure of claim 3 wherein said crank is jointed at an intermediate position to include an arm which may be rotated between a storage position wherein the arm is coaxial with said axle and an operative position wherein said arm extends perpendicularly to said axle for rotation thereof.

* * * * *